(12) United States Patent
Bajema et al.

(10) Patent No.: US 9,291,702 B2
(45) Date of Patent: *Mar. 22, 2016

(54) APPARATUS FOR INDICATING THE LOCATION OF A SIGNAL EMITTING TAG

(71) Applicant: GLOBALFOUNDRIES INC., Grand Cayman (KY)

(72) Inventors: Daniel T. Bajema, Lake Elsinore, CA (US); Joseph P. Edgar, Round Rock, TX (US); Jeffrey R. McCallum, Tucson, AZ (US); Thuan Q. Nguyen, Tucson, AZ (US); Socheat Sou, Tucson, AZ (US)

(73) Assignee: GLOBALFOUNDRIES INC., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 14/478,417

(22) Filed: Sep. 5, 2014

(65) Prior Publication Data

US 2015/0002269 A1    Jan. 1, 2015

Related U.S. Application Data (63) Continuation of application No. 13/927,237, filed on Jun. 26, 2013.

(51) Int. Cl.
*G01S 5/06* (2006.01)
*G01S 5/02* (2010.01)
*G01S 5/14* (2006.01)
*G08B 13/24* (2006.01)
*G08B 15/00* (2006.01)

(52) U.S. Cl.
CPC ..... *G01S 5/06* (2013.01); *G01S 5/02* (2013.01); *G01S 5/14* (2013.01); *G08B 13/248* (2013.01); *G08B 13/2462* (2013.01); *G08B 15/00* (2013.01)

(58) Field of Classification Search
CPC ...................................................... G08B 13/14
See application file for complete search history.

(56) References Cited

U.S. PATENT DOCUMENTS

| | | | |
|---|---|---|---|
| 7,221,269 B2 * | 5/2007 | Onderko et al. | 340/539.13 |
| 7,230,534 B2 | 6/2007 | Elledge | |
| 7,432,805 B2 | 10/2008 | Agrawal et al. | |
| 7,667,602 B2 | 2/2010 | Ulrich | |
| RE41,171 E | 3/2010 | Howe, Jr. | |

(Continued)

OTHER PUBLICATIONS

U.S. Appl. No. 13/927,237, entitled "Apparatus for Indicating the Location of a Signal Emitting Tag", filed Jun. 26, 2013.

*Primary Examiner* — Jennifer Mehmood
*Assistant Examiner* — Pameshanand Mahase
(74) *Attorney, Agent, or Firm* — DeLio, Peterson & Curcio, LLC; Kelly M. Nowak (57) ABSTRACT

An apparatus for indicating the location of a signal emitting tag. The apparatus includes signal detectors, control logic, and at least one light producing device. The control logic activates the light producing device in response to receiving data from the signal detectors. After activation, the light producing device illuminates the location of an individual that is near the point of origin of a signal that was detected by the signal detectors.

20 Claims, 5 Drawing Sheets

(56) References Cited

U.S. PATENT DOCUMENTS

| | | |
|---|---|---|
| 7,734,299 B2 | 6/2010 | Panabaker et al. |
| 8,113,418 B2 | 2/2012 | Howarth et al. |
| 8,269,609 B2 | 9/2012 | O'Hern |
| 2002/0063622 A1* | 5/2002 | Armstrong et al. ........ 340/10.31 |
| 2003/0214387 A1 | 11/2003 | Giaccherini |
| 2004/0169587 A1* | 9/2004 | Washington ............... 340/573.1 |
| 2005/0012613 A1* | 1/2005 | Eckstein et al. ......... 340/539.13 |
| 2006/0145859 A1 | 7/2006 | Posamentier |
| 2007/0268133 A1* | 11/2007 | Sanchez ............. A61B 19/0248 340/568.1 |
| 2010/0097221 A1* | 4/2010 | Kreiner et al. ............. 340/572.1 |
| 2010/0277284 A1* | 11/2010 | Brown et al. ................ 340/10.3 |
| 2011/0298607 A1 | 12/2011 | Priyantha et al. |

* cited by examiner

APPARATUS FOR INDICATING THE LOCATION OF A SIGNAL EMITTING TAG

FIELD OF THE INVENTION

The present invention relates generally to the field of security, and more particularly to using triangulation to locate and indicate, via illumination, the location of signal emitting tags.

BACKGROUND OF THE INVENTION

During peak shopping seasons many vendors struggle to keep track of stock. In an effort to improve stock control, many vendors have turned to the use of radio frequency identification (RFID) tags. There are five general types of RFID tags. They are inductively coupled, capacitively coupled, active, semi-active, and passive RFID tags. All five types of RFID tags operate using similar steps. Data is stored within an RFID tag's microchip and the tag is attached to an item to be tracked. The tag's antenna receives electromagnetic energy from an RFID detector's antenna. Using power from an internal battery or power harvested from the detector's electromagnetic field, the RFID tag sends radio waves back to the detector. The detector picks up the radio waves and interprets the frequencies as meaningful data.

In general, RFID tags attached to items being purchased are deactivated during checkout. However, this does not always occur, e.g., when there is a malfunction of the RFID tag de-activator or when an RFID tag is not de-activated by a cashier. When an active RFID tag enters into range of an RFID detector, the detector indicates the presence of the active RFID tag, often through the use of a siren or other alarm. This can lead to general confusion for customers as there may be numerous individuals within range of the RFID detector and all of whom may have multiple purchases.

SUMMARY

An apparatus for indicating the location of a signal emitting tag. The apparatus comprises a plurality of signal detectors, a control logic, and at least one light producing device. The control logic activates the at least one light producing device in response to receiving data from the plurality of signal detectors. In response to being activated by the control logic, the at least one light producing device illuminates a location of an individual that is collocated with a point of origin of a signal.

DETAILED DESCRIPTION

Known radio frequency identification (RFID) detection measures often include RFID detectors located near the exits of vendors. When an active RFID tag enters into range of the RFID detector the detector triggers an alarm, which is often audible and can include flashing lights. Such detectors do not indicate which customer has the active RFID tag in his or her possession or the location of the item that includes the active RFID tag. When several customers leave simultaneously, an activated alarm can cause frustration and confusion for the customers as well as the vendor.

Figure 1:
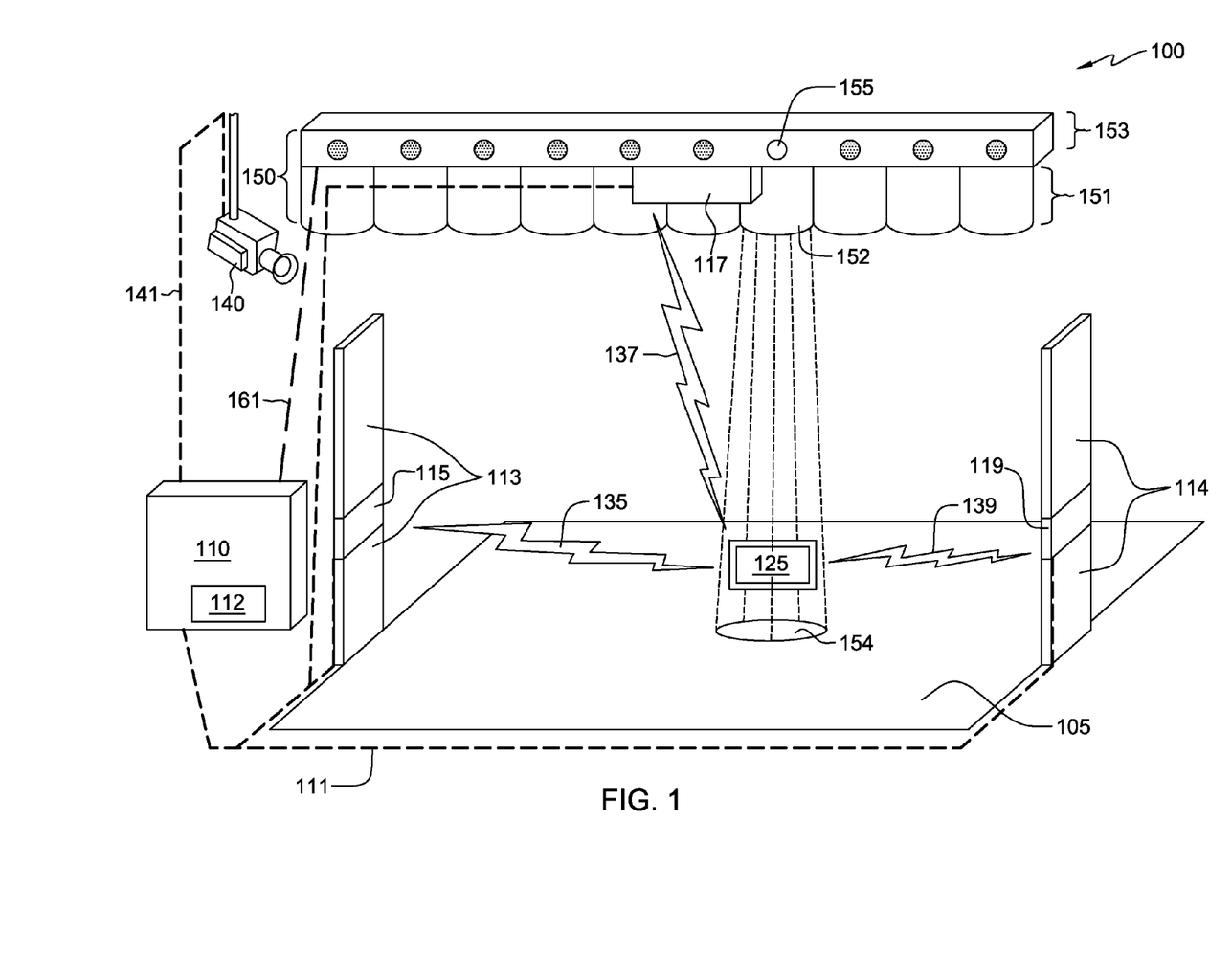
FIG. 1 is a block diagram illustrating a component layout for a detection system, in accordance with a first embodiment of the present invention.
Figure 2:
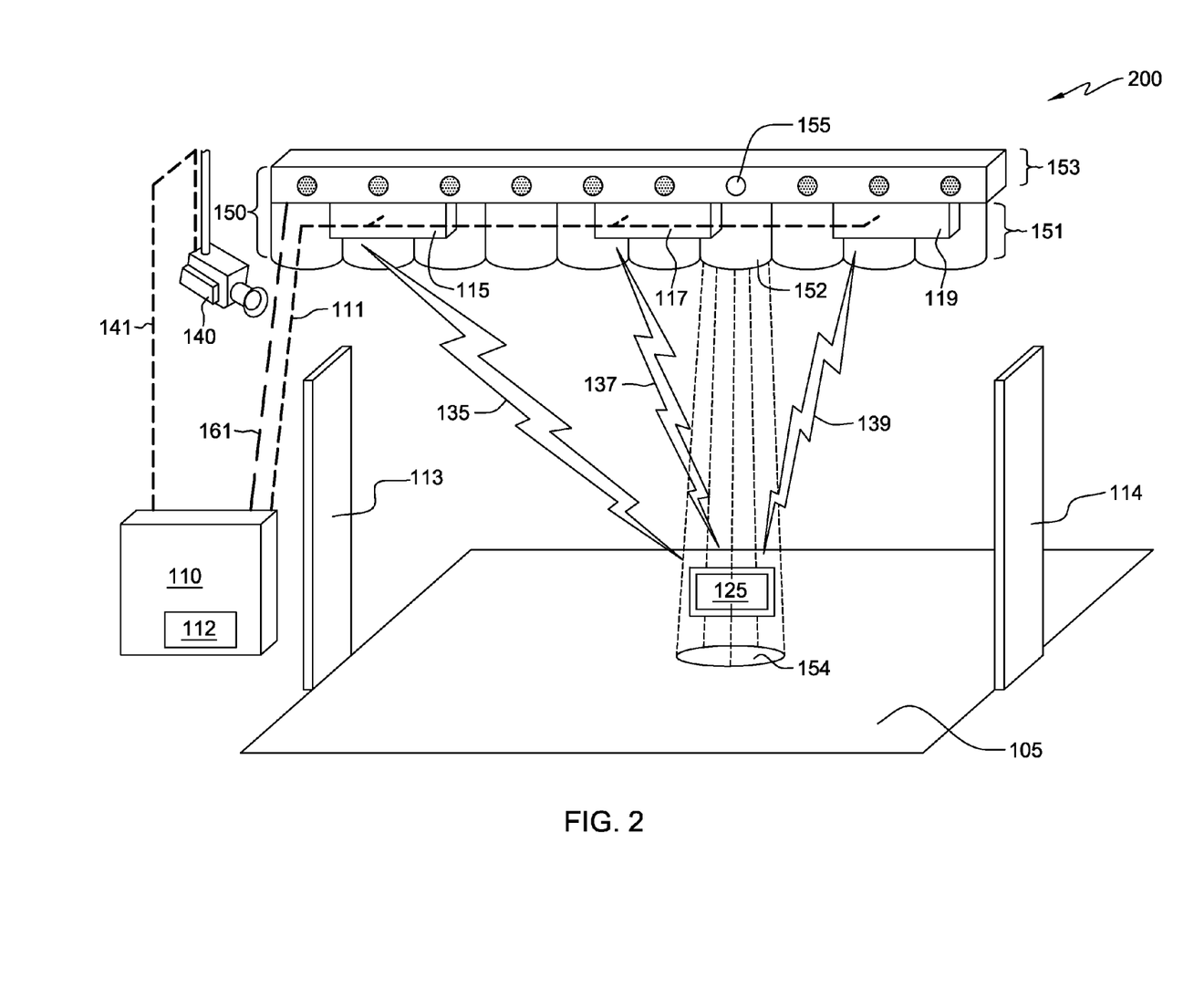
FIG. 2 is a block diagram illustrating a component layout for a detection system, in accordance with a second embodiment of the present invention.
Figure 3:
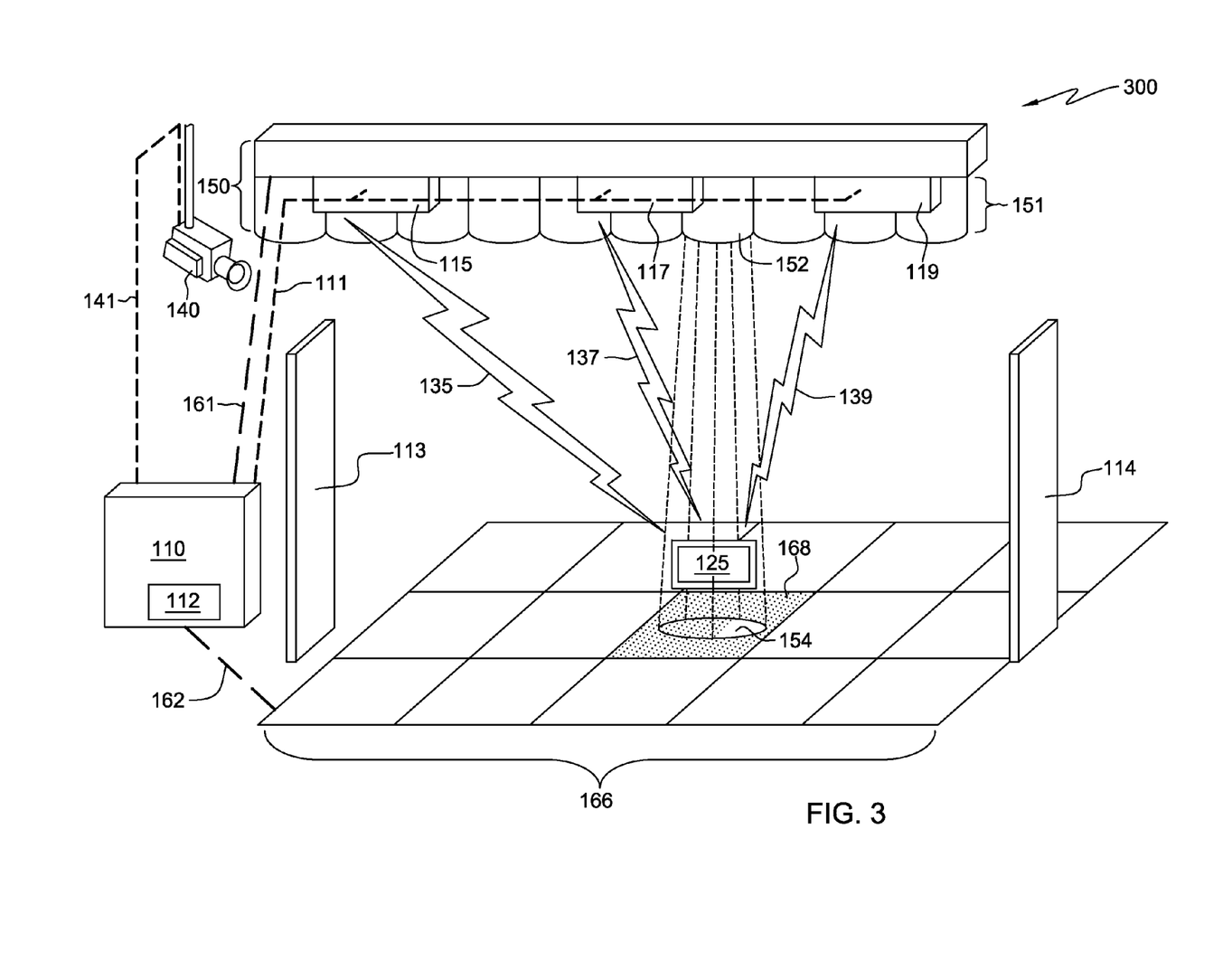
FIG. 3 is a block diagram illustrating a component layout for a detection system, in accordance with a third embodiment of the present invention.

The present invention will now be described in detail with reference to the Figures. The following is a general discussion of the respective components included FIGS. 1, 2, and 3. It is to be noted that the components included in FIGS. 1 and 2 are the same. However, the placement of radio frequency identification (RFID) signal detectors, herein denoted 115, 117, and 119, varies with respect to FIGS. 1, 2, and 3. It is also to be noted that the description of illuminating device 150 of FIG. 3 is not identical to the description of illuminating device 150 of FIGS. 1 and 2. Illuminating device 150 of FIG. 3 does not include indicator lights 153 and 155. Further, FIG. 3 includes indicating tiles 166 and 168 in place of surface 105 (see the discussion of FIG. 3 for further details).

FIGS. 1, 2, and 3 illustrate three different embodiments of the present invention. Similar components are herein denoted via same name, number, and description. While each embodiment shares the same type of and number of components, the placement of certain components varies. Typically, this variation includes changes in the location of radio frequency identification (RFID) signal detectors, herein denoted 115, 117, and 119. The placement of RFID signal detectors or other components can be varied to meet the needs and desires of a user, e.g., a store that installs the detection system. While each of the embodiments includes three RFID signal detectors, it is to be understood that this is for illustrative purposes only. There are many embodiments in which more or less than three RFID signal detectors are used. The RFID signal detectors can be used to triangulate the source of a signal. Triangulating includes any use of two or more signal detectors to locate the source of a signal in space, e.g., in two dimensions or three dimensions, etc. In general, the use of more RFID signal detectors can increase signal reception and the accuracy of triangulating the source of a signal. For example, a radio frequency absorbing material is surrounding an RFID tag. The absorbing material absorbs enough of the RFID signal to make triangulation impossible using only three RFID signal detectors, since the received signals are too weak. However, by using a fourth RFID signal detector more signal is detected and the triangulation can be made.

Respective FIGS. 1, 2 and 3 include computing device 110, which includes and executes triangulation program 112.

In various embodiments, computing device 110 can be a laptop computer, a notebook computer, a desktop computer, or any other computing device. In another embodiment, computing device 110 represents a computing system utilizing clustered computers and components to act as a single pool of seamless resources. Computing device 110 may include internal and external hardware components, as depicted and described in further detail with respect to FIG. 4.

In certain embodiments, triangulation program 112 can be stored on any computer-readable media that is accessible by computing device 110. Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

In certain embodiments, triangulation program 112 can be stored externally to computing device 110 and accessed through a network (not shown). The network can be, for example, a local area network (LAN), a wide area network (WAN) such as the Internet, or a combination of the two, and may include wired, wireless, fiber optic or any other connection known in the art. In general, the network can be any combination of connections and protocols that will support communications between computing device 110 and triangulation program 112, or provide computing device 110 access to triangulation program 112.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In general, signal emitter 125 can be any type of active RFID tag or similar device that will send a signal to a signal detector, such as radio frequency identification (RFID) detector 115, 117, and 119. In general, surface 105 is an area where signal emitter 125 is located. RFID detector 115, 117, and 119 are positioned around or near surface 105 such that a signal emitted by signal emitter 125 will be detected by RFID detector 115, 117, and 119.

In the embodiments described herein, to differentiate the differences in strength of a signal or a time that a signal is received by respective RFID detector 115, 117, and 119, three different RFID signals, denoted RFID signal 135, 137, and 139, are illustrated in FIGS. 1, 2, and 3 as lighting bolts (but are radio signals). RFID detector 115 detects RFID signal 135. RFID detector 117 detects RFID signal 137. RFID detector 119 detects RFID signal 139. It is to be noted that such differentiation is for illustrative purposes only. The three respective signals, RFID signal 135, 137, and 139, are in many embodiments a single signal that is emitted by signal emitter 125. In other embodiments, three different signals (e.g., three signals with different respective frequencies) are detected by the respective RFID detector 115, 117, and 119. In such a case, triangulation program 112 uses the data from RFID detector 115, 117, and 119 to determine the location of signal emitter 125.

In FIGS. 1, 2, and 3 respective RFID detector 115, 117, and 119 are connected to computing device 110 using detector connection 111. Detector connection 111 is, in general, any connection that is capable of passing the data from RFID detector 115, 117, and 119 to computing device 110.

Triangulation program 112 processes data received from the signal detectors that receive signals from signal emitting tags, such as RFID tags. Triangulation program 112 can be any form of control logic that can perform the functions of triangulation program 112 described herein. For example, in some embodiments, the programming of triangulation program 112 is included in an integrated circuit. In another embodiment, the programming of triangulation program 112 is stored on a hard-drive that is accessible by computing device 110.

Triangulation program 112 determines the location of the point of origin of the signal, such as signal emitter 125, using triangulation. The triangulation can be based on the respective times at which the signal is received by various signal detectors (e.g., signal detectors 115, 117, and 119, etc.). The triangulation can be based on the respective strength of the signal that is received by various signal detectors. In some embodiments, both the time the signal is received and the strength of the received signal are used to triangulate the point of origin of the signal, e.g. the location of an active RFID tag.

In some embodiments, computing device 110 is connected to imaging device 140 via connection 141, which can transmit signals between computing device 110 and imaging device 140. Imaging device 140 in the embodiments described herein is a video camera. Imaging device 140 captures video images and send them to computing device 110 during video recording sessions.

In some embodiments, triangulation program 112 includes programming to overlay a display of the location of the point of origin of the signal onto the video captured during a video recording session. For example, a video recording session in a store includes a customer that has an activated RFID tag in their possession. As the customer attempts to exit the store the activated tag sends a signal to the RFID tag detectors. Triangulation program 112 processes the data from signal detectors 115, 117, and 119 and determines the point of origin of the signal. The point of origin of the signal, i.e., the location of the RFID tag, is then overlaid onto the captured video to visually indicate the location of the active RFID tag.

In certain embodiments, triangulation program 112 includes programming to trigger an alarm in response to receiving data from signal detectors that receive signals from signal emitting tags. Such alarms can include audio and visual aspects; e.g. sirens and flashing lights.

Computing device 110 is connected to illuminating device 150 using lighting connection 161. Lighting connection 161 is, in general, any connection that is capable of passing signals, e.g., data to activate and direct lighting, from computing device 110 to illuminating device 150 and indicator lights 153 and 155. In the embodiments of FIGS. 1 and 2 described herein, illuminating device 150 includes a strip of indicator lights 153. Indicator lights 153 are activated by triangulation program 112 to indicate a general location of a point of origin of a signal. When activated, one or more of indicator lights 153 become respective indicator lights 155 that provide a general location of a point of origin of a signal. In continuation with the above example, triangulation program 112 processes the data from the signal detectors and determines the point of origin of the signal. Triangulation program 112 then activates indicator lights 155 that are most directly located above the point of origin of the signal (as seen in FIGS. 1 and 2 and as described in further detail below).

Illuminating device 150 can also include a group of movable spot lights, herein denoted tracking spotlights 151, which in one embodiment have pitch and yaw motors to reorient the direction they cast light. Once activated, a given tracking spotlights 151 is denoted as tracking spotlights 152. Tracking spotlights 151 are activated by triangulation program 112 to indicate a specific location of a point of origin of a signal. In continuation with the above example, triangulation program 112 processes the data from the signal detectors and determines the point of origin of the signal. Triangulation program 112 then activates the one or more tracking spotlights 151 that are most directly located above the point of origin of the signal, thereby creating one or more tracking spotlights 152. Tracking spotlights 152 respectively emit beams of light, herein denoted light-beams 154, which herein are shown as illuminating signal emitter 125 and a section of surface 105. In certain embodiments, triangulation program 112 can activate one or more tracking spotlights 151, which are not located directly above the point of origin of the signal. In such a case, triangulation program 112 orients the respective light-beams 154 to illuminate the point of origin of the signal.

In certain embodiments, triangulation program 112 tracks and readjusts the orientation of light-beams 154 to continuously illuminate the point of origin of the signal. This can aid in the identification of the point of origin of the signal when there are a number of individuals within range of RFID signal detectors 115, 117, and 119.

Triangulation program 112 sends signals to tracking spotlights 152 to orient light-beams 154 such that the light-beams 154 illuminates the specific location of the point of origin of the signal. Light-beams 154 can be seen to indicate a point of a pathway that passes over surface 105. For example, a customer leaving a store has a purchased item in their possession. However, the RFID tag was not deactivated during checkout due to a hardware malfunction. As the customer passes under illuminating device 150, triangulation program 112 determines the specific location of the point of origin of the signal, e.g., signal emitter 125. Triangulation program 112 then sends a signal to the one tracking spotlights 151 that is most directly located above the RFID tag, and activates that one tracking spotlights 151 creating one or more tracking spotlights 152, which begin emitting respective light-beams 154. Triangulation program 112 sends signals to tracking spotlights 152 to orient light-beams 154 such that the RFID tag is illuminated by light-beams 154. The customer has a bag of purchases in each hand. However, light-beams 154 only illuminate the bag in the right hand of the customer, because that is where signal emitter 125 is located.

FIG. 1 is a block diagram, 100, illustrating a component layout for a detection system, 100, in accordance with a first embodiment of the present invention. In FIG. 1, RFID detector 115 and 119 are located on opposite sides of surface 105. Both RFID detector 115 and 119 are illustrated as being integral with respective guide 113 and 114. The activation of light-beams 154 is shown illuminating the point of origin of a signal, i.e., signal emitter 125, which is located between RFID detector 115 and 119. Guide 113 and 114 are, in one embodiment, structures to limit the possible pathways of an individual carrying signal emitter 125. For example, guides 113 and 114 are placed at the outer edges of a doorway of a store. The placement of guide 113 and 114 encourages customers to cross surface 105 thereby allowing RFID detector 115, 117, and 119 an opportunity to detect a signal from signal emitter 125.

In some embodiments, guide 113, 114 include inductive coils that provide a source of power for signal emitter 125. In FIG. 1, RFID detector 117 is shown as integral with illuminating device 150. The configuration of RFID detector 115, 117, and 119 in FIG. 1 can increase the difficulty of blocking the signal emitted by signal emitter 125 since the signal would have to be blocked on multiple sides. While blocking on one or more sides can inhibit the triangulation of signal emitter 125, by triangulation program 112, the chances of a general detection are still high.

FIG. 2 is a block diagram, 200, illustrating a component layout for a detection system, 200, in accordance with a second embodiment of the present invention. In FIG. 2, RFID detector 115, 117, and 119 are integral with illuminating device 150. Such a configuration can provide a simplified installation of the detection system. In certain embodiments, multiple illuminating device 150 with integral RFID detector 115, 117, and 119 can be employed to monitor an extended surface 105. For example, a store has two such illuminating device 150. The first illuminating device 150 is located on the inside of a given doorway and the second is located on the outside of that doorway. In another example, such illuminating devices 150 are placed at the various pathway intersections of a shopping mall, thereby forming arches under which potential customers must pass. Such a configuration can provide multiple venues with additional security.

FIG. 3 is a block diagram, 300, illustrating a component layout for a detection system, 300, in accordance with a third embodiment of the present invention. In FIG. 3, RFID detector 115, 117, and 119 are integral with illuminating device 150. However, unlike the previous embodiments, surface 105 has been replaced with a grid of light emitting tiles designated indicating tiles 166 and 168. Indicating tiles 166 and 168 are connected to computing device 110 using grid connection 162. Grid connection 162 is, in general, any connection that is capable of passing signals, e.g., data to activate the light emitting tiles, from computing device 110 to indicating tiles 166 and 168.

As with indicator lights 153 of illuminating device 150 of FIGS. 1 and 2, the light emitting tiles are activated by triangulation program 112 to indicate a general location of a point of origin of a signal. When activated, a given light emitting tile illuminates to provide a general location of a point of origin of a signal. An activated indicating tiles 166 is herein denoted as indicating tiles 168. The use of a grid of light emitting tiles allows the location of a point of origin of a signal to be visually confirmed in at least two dimensions. Thus, the light emitting tiles can make it easier for customers to identify if they are in possession of an active signal emitting tag, e.g., signal emitter 125. For example, several customers are leaving a shopping center at the same time and an alarm is triggered when RFID detector 115, 117, and 119 detect a signal from signal emitter 125. The tile under the customer in possession of signal emitter 125 lights up, i.e., tile 168 is illuminated. As a result the customer is able to more easily identify that their purchase includes signal emitter 125.

As seen in the above described embodiments, there are many possible configurations of the components, included in a given detection system, which are within the scope and spirit of the invention. As seen in the respective component configurations of FIGS. 1 and 2, signal detectors 115,117, and 119 can be placed in a number of locations. As seen in FIG. 3, the location of light emitting components that indicate the location of a signal source, such as signal emitter 125, can vary.

Figure 4:
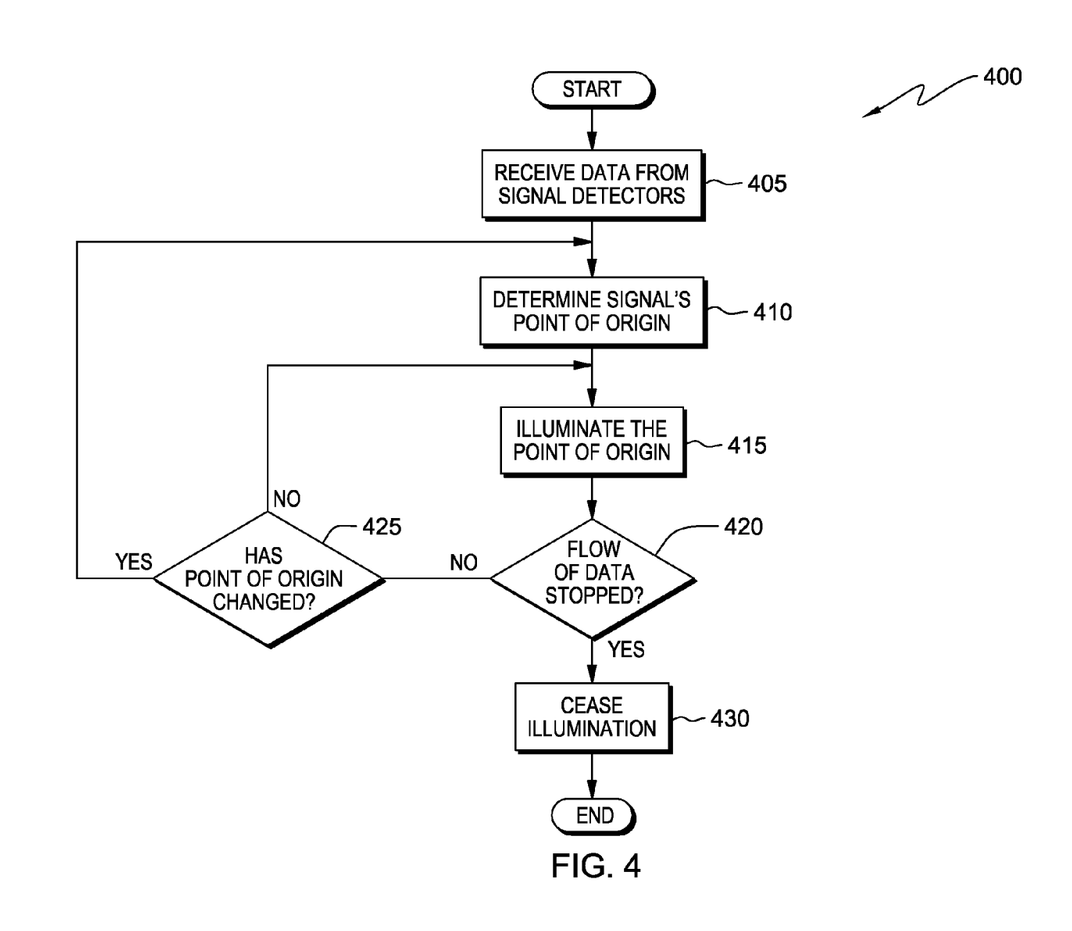
FIG. 4 is a flowchart illustrating the operational steps of a triangulation program executing on a computing device of a detection system, in accordance with an exemplary embodiment of the present invention.

FIG. 4 is a flowchart, 400, illustrating the operational steps of triangulation program 112 executing on a computing device 110 of a detection system, in accordance with an exemplary embodiment of the present invention.

In step 405, triangulation program 112 receives data from signal detectors, such as signal detectors 115,117, and 119. Data is sent by a signal detector when it detects a signal from a signal emitting tag, such as signal emitter 125. As long as a given signal detector is detecting the signal, that signal detector continues to send data to triangulation program 112. The combined data from the signal detectors includes the information needed to calculate the point of origin of the signal, i.e. the location of the signal emitting tag. For example, the signal transmitted by signal emitter 125, is received by respective signal detectors 115,117, and 119. The data that signal detectors 115,117, and 119 send to triangulation program 112 includes the respective strength of the signal and respective time of signal detection as detected by signal detectors 115,117, and 119.

In step 410, triangulation program 112 determines the signal's point of origin using the data sent by the respective signal detectors. For example, in continuation with the above example, triangulation program 112 uses the respective differences in strength of the signal and respective time of signal detection as detected by signal detectors 115,117, and 119 to determine the location of signal emitter 125, i.e., triangulation program 112 triangulates the location of signal emitter 125.

In step 415, triangulation program 112 sends signals to a number of lights that then illuminate the point of origin of a signal. For example, triangulation program 112 sends signals to and thereby turns on an indicating tiles 168 located beneath signal emitter 125 and a indicator lights 155 located above signal emitter 125. Triangulation program 112 also sends signals to two tracking spotlights 152. The two tracking spotlights 152 orient their respective light-beams 154 such that the light-beams 154 illuminate the location of signal emitter 125.

In decision step 420, triangulation program 112 determines if the flow of data has stopped, i.e., if the signal detectors have stopped sending data to triangulation program 112. If the triangulation program 112 determines that the flow of data has stopped (decision step 420, yes branch), then triangulation program 112 ceases illumination of the point of origin, in step 430. For example, signal emitter 125 moves out of detection range of signal detectors 115,117, and 119. As a result, signal detectors 115,117, and 119 cease sending data to triangulation program 112. Triangulation program 112 detects that there is no longer data being sent and turns off the lights that were illuminating the point of origin of the signal. If triangulation program 112 determines that the flow of data has not stopped (decision step 420, no branch), then triangulation program 112 determines if the point of origin of the signal has changed, in decision step 425.

In decision step 425, triangulation program 112 determines if the point of origin of the signal has changed, based on the data being sent by the signal detectors. For example, the data from signal detectors 115,117, and 119 include changes in the respective differences in strength of the signal and respective time of signal detection. As a result of the detected changes in the data, triangulation program 112 determines that the point of origin of the signal has changed. If triangulation program 112 determines that the point of origin of the signal has changed (decision step 425, yes branch), then triangulation program 112 calculates the signal's point of origin in step 410. If triangulation program 112 determines that the point of origin of the signal has not changed (decision step 425, no branch), then triangulation program 112 illuminates the point of origin in step 415.

In certain embodiments, triangulation program 112 is able to differentiate, triangulate, and track two or more signal emitting tags simultaneously. Each respective tag is illuminated accordingly, by triangulation program 112.

Figure 5:
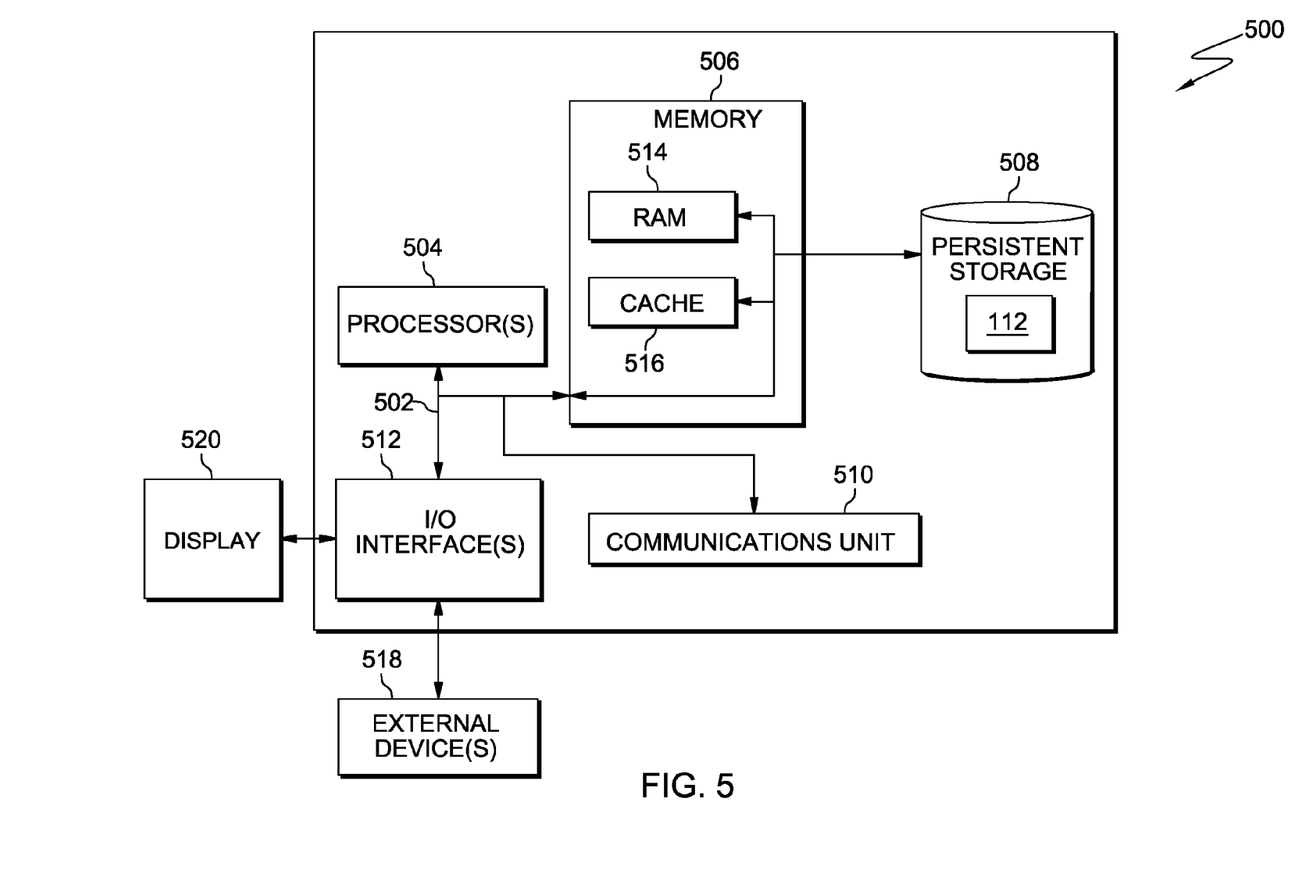
FIG. 5 depicts a block diagram of components of the computing device, in accordance with an exemplary embodiment of the present invention.

FIG. 5 depicts a block diagram, 500, of components of computing device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

In certain embodiments, triangulation program 112 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices that are in communication with computing device 110. In these examples, communications unit 510 includes one or more network interface cards. Communications unit 510 may provide communications through the use of either or both physical and wireless communications links. Triangulation program 112 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., the triangulation program 112, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Having described the preferred embodiment of creating a detection system using the aforementioned devices and structures (which are intended to be illustrative and not limiting), it is noted that modifications and variations may be made by persons skilled in the art in light of the above teachings.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

Each respective figure, in addition to illustrating the structure of the present invention at various stages, also illustrates the respective steps of the respective methods for the fabrication/manufacture and use of such a detection system using the aforementioned devices and structures.

What is claimed is:

1. A method for indicating the location of a signal emitting tag, the apparatus comprising:
   providing a plurality of signal detectors;
   emitting a signal from a signal emitting tag carried by an individual that is collocated with a point of origin of said signal:
   receiving said signal at one or more of said plurality of signal detectors;
   transmitting the received signal data from the one or more plurality of signal detectors to a control logic;
   determining, by said control logic, a location of said signal based on known locations of said one or more plurality of signal detectors;
   activating, by said control logic, at least one visible light producing device in response to the data received from the plurality of signal detectors and the identified location of said signal;
   illuminating, by the control logic, said location of said signal using the at least one visible light producing device to identify said point of origin of said signal emitting tag based on said signal collocated with the individual; and
   monitoring said point of origin of said signal emitting tag, based, at least in part, on the data from the plurality of signal detectors, for readjusting orientation of the visible light producing device to continuously illuminate the point of origin of the signal.

2. The method of claim 1, the method further comprising:
   receiving, by the control logic, data from the plurality of signal detectors in response to the detection of the signal by the plurality of signal detectors; and
   triangulating, by the control logic, a location of the point of origin of the signal based on data from the plurality of signal detectors.

3. The method of claim 2, wherein the data received by the control logic includes a respective strength of the signal as detected by a signal detector included in a plurality of signal detectors.

4. The method of claim 2, wherein the data received by the control logic includes a respective time that the signal is detected by a signal detector included in the plurality of signal detectors.

5. The method of claim 2, the method further comprising:
   receiving, by the control logic, a first data from a first signal detector, wherein the first signal detector sends the first data to the control logic in response to detecting the signal;
   receiving, by the control logic, a second data from a second signal detector, wherein the second signal detector sends the second data to the control logic in response to detecting the signal; and
   receiving, by the control logic, a third data from a third signal detector, wherein the third signal detector sends the third data to the control logic in response to detecting the signal.

6. The method of claim 5, the method further comprising:
triangulating, by control logic, the location of the point of origin of the signal based on the first data, the second data, and the third data.

7. The method of claim 6, wherein the triangulation of the location of the point of origin of the signal is based, at least in part, on a respective strength of the signal that was received by the first signal detector, the second signal detector, and the third signal detector.

8. The method of claim 6, wherein the triangulation of the location of the point of origin of the signal is based, at least in part, on a respective time that the signal was received by the first signal detector, the second signal detector, and the third signal detector.

9. The method of claim 5, the method further comprising:
detecting, by the control logic, a passage of an individual under the first signal detector, based, at least in part, on the first data, the second data, and the third data.

10. The method of claim 5, the method further comprising:
detecting, by the control logic, a passage of an individual between the second signal detector and the third signal detector, based, at least in part, on the first data, the second data, and the third data.

11. The method of claim 10, the method further comprising:
activating, by the control logic, the at least one visible light producing device, such that visible light emitted from the at least one visible light producing device indicates the location of the point of origin of the signal between the second signal detector and the third signal detector.

12. The method of claim 1, wherein the signal is generated by a radio frequency identification tag.

13. The method of claim 1, wherein the at least one visible light producing device illuminates the location of the point of origin of the signal to identify said individual as the individual actual carrying the signal emitting tag from a number of other individuals located within range of said one or more plurality of signal detectors.

14. The method of claim 5, wherein the at least one visible light producing device comprises a plurality of visible light producing devices that, when activated, indicate the of the point of origin of the signal in at least two dimensions, said first dimension residing above the signal emitting tag and said second dimension residing below the signal emitting tag.

15. The method of claim 1, the method further comprising:
triggering, by the control logic, an alarm in response to the reception of data from the plurality of signal detectors.

16. The method of claim 1, the method further comprising:
initiating, by the control logic, a video recording session in response to the reception of data from the plurality of signal detectors.

17. The method of claim 16, the method further comprising:
overlaying, by the control logic, a display of the location of the point of origin of the signal onto video captured during the video recording session.

18. The method of claim 1, wherein the at least one visible light producing device illuminates an area that includes the point of origin of the signal.

19. The method of claim 1, the method further comprising:
indicating, by the control logic, at least one point on a pathway taken by the individual using illumination produced by the at least one visible light producing device.

20. The method of claim 1, the method further comprising:
changing, by the control logic, an indicated location of the individual, based, at least in part, on a determined change in the location of the point of the signal such that the indicated location of the individual corresponds to the location of the point of origin of the signal.

* * * * *